US007242739B2

(12) United States Patent
Boles et al.

(10) Patent No.: US 7,242,739 B2
(45) Date of Patent: Jul. 10, 2007

(54) METHOD AND APPARATUS FOR MULTIPHASE, FAST-LOCKING CLOCK AND DATA RECOVERY

(75) Inventors: Glenn M Boles, Fords, NJ (US); Alfred Earl Dunlop, Kattskill Bay, NY (US); Manyalibo Joseph Matthews, Jersey City, NJ (US); Dusan Suvakovic, Florham Park, NJ (US); Doutje T. Van Veen, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 806 days.

(21) Appl. No.: 10/460,572

(22) Filed: Jun. 12, 2003

(65) Prior Publication Data

US 2004/0252801 A1    Dec. 16, 2004

(51) Int. Cl.
*H03D 3/24*   (2006.01)
(52) U.S. Cl. .................. 375/375; 375/376; 375/371
(58) Field of Classification Search .............. 375/375, 375/376, 371, 372; 331/2, 57; 327/158, 327/149, 161, 144
See application file for complete search history.

(56) References Cited

U.S. PATENT DOCUMENTS

| 6,236,695 | B1 * | 5/2001 | Taylor ..................... 375/372 |
| 6,259,326 | B1 * | 7/2001 | Dunlop et al. ................ 331/2 |
| 6,373,911 | B1 * | 4/2002 | Tajima et al. ............... 375/375 |
| 6,377,644 | B1 * | 4/2002 | Naudet ..................... 375/371 |
| 6,983,032 | B2 * | 1/2006 | Mujica et al. .............. 375/375 |

* cited by examiner

*Primary Examiner*—Phuong Phu

(57) ABSTRACT

A method and apparatus for clock and data recovery that is advantageous in burst-mode systems is disclosed. This clock and data recovery method allows a) fast locking to a rapidly changed phase of the transmission clock, and b) stable tracking of a slowly changing phase of the transmission clock. Such fast locking minimizes the "guard band" between consecutive transmission bursts, while stable tracking provides reliable data tracking, resulting in the efficient use of bandwidth. A plurality of clock signals, is generated, each having a different phase. The phase of an input signal data stream is determined and a desired clock signal in the plurality that corresponds to the phase of the input data stream is selected and used to sample the input signal data stream.

4 Claims, 7 Drawing Sheets

METHOD AND APPARATUS FOR MULTIPHASE, FAST-LOCKING CLOCK AND DATA RECOVERY

FIELD OF THE INVENTION

The invention relates to digital data transmission networks and, more specifically, to enhancing the efficiency of data transmission in digital data transmission networks.

BACKGROUND OF THE INVENTION

There are numerous manners in which to transfer data from a transmitter to a receiver. In a typical system for transferring data, a transmitter has clock circuitry that controls the speed at which data is transferred via a communications medium. A receiver in such a system also typically has clock circuitry that controls the speed at which the data that is received from the communications medium is processed.

Ideally, the receiver's clock and the transmitter's clock will operate at exactly the same frequency and will be appropriately aligned in phase. However, the clock used by the transmitter is typically different in phase and slightly different in frequency as compared to that of the receiver. Further, the data may be variably delayed through the transmission medium as well as through the receiver circuitry. For the case of transmission systems in which several transmitters are transmitting to one or more receivers (for instance, over a time-division multiplexed network), the receivers must recover each transmitter's clock and data, and therefore the receiver circuitry must be able to respond to any number of different phases and perhaps slightly different frequencies within a specified tolerance. Such a system in which data traveling along the transmission medium contains time-division-multiplexed "bursts" of data originating from transmitters with nearly the same clock frequency and no phase alignment is henceforth referred to as a "burst-mode" transmission system.

The efficiency of burst-mode systems is characterized by the ratio of a) the amount of time in the data stream occupied by the readable component of the data bursts, to b) the "unused" amount of time in the data stream comprised of inter-burst time gaps. To increase the efficiency of any burst-mode system, one seeks to reduce the time overhead introduced by the receiver circuitry and to minimize these inter-burst time gaps. In order to achieve the latter, all sources of delays in the transmission system must be accurately characterized and controlled. For instance, clock and data recovery (CDR) circuits may introduce timing delays due to slow synchronization when switching between bursts that prevent the efficient control and minimization of inter-burst time gaps. One method of addressing these efficiency and gap minimization problems is to measure the time delay and phase differences between the clock at the transmitter and the clock at the receiver. However, in order to measure this timing delay, it is necessary to know the characteristics of the clock at the transmitter, which is usually remote from the receiver. Therefore, some method of recovering the transmitter clock characteristics and associating those characteristics with the receiver clock and a particular data transmission is required.

Generally, in non-burst mode transmission systems CDR can easily be achieved by either standard open-loop or closed-loop clock recovery systems. Examples of these systems, which are well known in the art, are described in I. Dorros et al., An Experimental 224 Mb/s Digital Repeated Line, The Bell System Technical Journal, Vol. 45, No. 7, pp. 993–1043 (September 1966) and R. R. Cordell et al. in A 50 Mhz Phase- and Frequency-Locked Loop, IEEE Journal of Solid State Circuits, Vol. SC-14, No. 6, pp 1003–1010 (December 1979), respectively. Open-loop systems are characterized by a narrow bandpass filter (e.g., a SAW filter), while closed-loop systems typically contain a simple phase-locked loop, which attempts to lock onto the phase of the incoming signal. While such methods sufficiently recover clock and data for continuous or pseudo-bursty data, they are ineffective at CDR in burst mode systems. More recently, cost-effective methods and apparatus for recovering the phase of a signal in a burst-mode transmission system have been developed that avoid many of the deficiencies associated with prior apparatus and methods. One such method suited for use with burst mode signals generates a recovered clock more quickly than other methods in the prior art. This method is the subject of U.S. Pat. No. 5,237,290, issued on Aug. 17, 1993 to Mihai Banu et. al., which is hereby incorporated by reference herein in its entirety. Specifically, according to the '290 patent, the transmitter clock is recovered with a bounded phase relationship with respect to the incoming data signal. Thus, the recovered transmitter clock and the incoming data signal will have the same frequency and their relative phase will remain within a given range.

In another prior attempt, described in U.S. Pat. No. 5,757,872, issued on May 26, 1998 also to Mihai Banu et. al., a FIFO buffer was incorporated into the method of the '290 patent in order to prevent the loss of data that could result from the potential lack of synchronization between the local receiver clock and the recovered transmitter clock. The '872 patent is hereby incorporated by reference in its entirety herein.

Another prior attempt is described in copending U.S. patent application Ser. No. 10/255,008, which is hereby incorporated by reference in its entirety herein. In that attempt, the phase difference between the recovered transmitter clock associated with an incoming data word and the receiver clock was measured in order to capture and align the words of an incoming data stream. This phase difference, coupled with the measurement of time delays experienced in buffers associated with the receiver, were used to time the transmission of data from individual transmitters in the network with a maximum efficiency while, at the same time, preventing conflicts between successive data words transmitted by different transmitters.

SUMMARY OF THE INVENTION

While the prior methods such as those disclosed in the '290 and '872 patents and the '008 patent application are advantageous in many regards, they are not capable of both fast locking when fast changes to the transmission clock occur and, simultaneously, stable tracking of a slowly changing phase of the transmission clock.

We have invented a method and apparatus for clock and data recovery wherein a plurality of clock signals, each having a different phase, is generated. The phase of a received input signal data stream is determined and the generated clock signal in the plurality that corresponds to the phase of the input data stream is selected and used to sample the input signal data stream. This clock and data recovery method allows a) fast locking to a rapidly changed phase of the transmission clock, and b) stable tracking of a slowly changing phase of the transmission clock. Rapid locking of the receive clock to the transmit clock and the subsequent reliable tracking thereof is achieved by utilizing only digital circuits, which also results in cost-effective implementation and reliable operation versus that of analog circuits. Such rapid locking also minimizes the "guard band" between, as well as the time overhead due to clock and data recovery within, consecutive transmission bursts, while stable tracking provides reliable data tracking, resulting in the efficient use of bandwidth. This method and apparatus also allows for infrequent use of the clock locking and tracking circuitry, which is beneficial as it results in low power dissipation.

DETAILED DESCRIPTION OF THE INVENTION

Figure 1A:
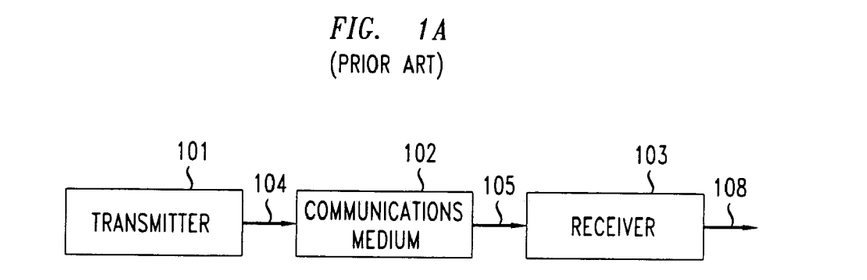
FIG. 1A shows a generic digital communication network.

FIG. 1A shows an illustrative communications network having a transmitter 101, a communication medium 102, and a receiver 103, connected as shown in the FIG. 1. Data stream 104 is outputted by the transmitter 101 into the communication medium 102 and is carried by medium 102 to receiver 103 as input data stream 105. The receiver 103 decodes input data stream 105 to produce output 108, which comprises an output data word stream supplemented with timing information.

Figure 1B:
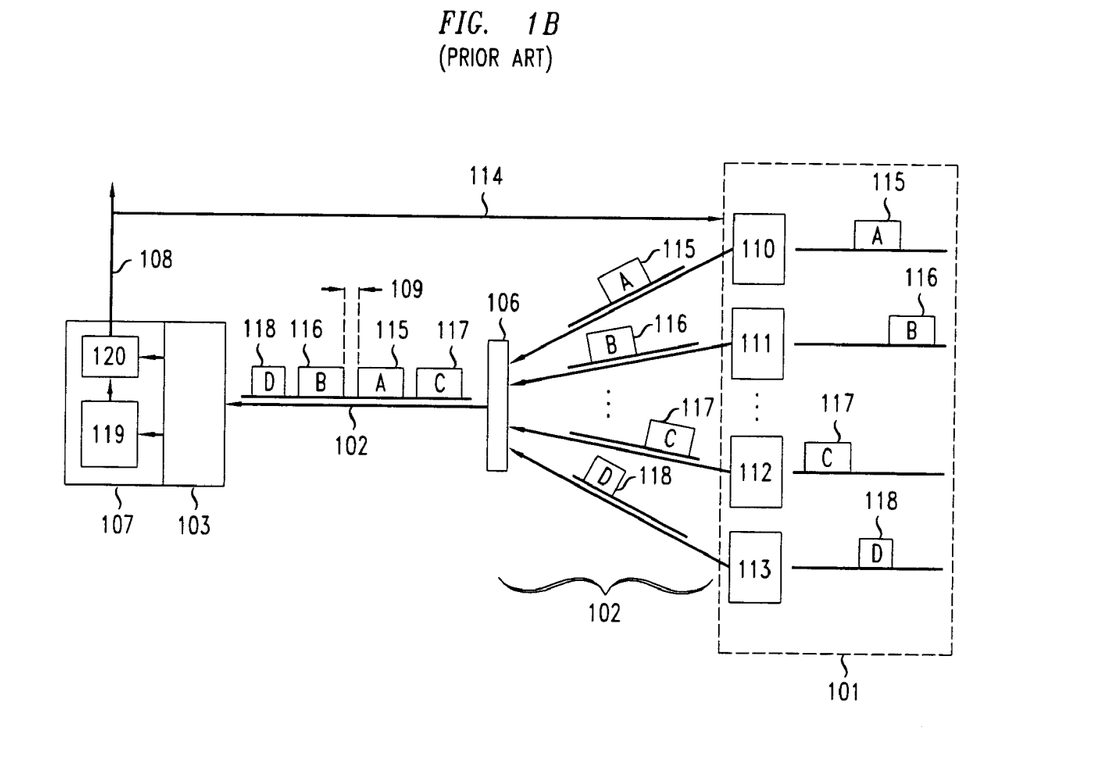
FIG. 1B shows a passive optical fiber time division multiple access communication network.

FIG. 1B shows a more specific illustrative communications network, namely a time-division multiple access (TDMA) passive optical communication network (PON) having multiple user transmitter nodes 110–113, within a group 101 of transmitters, transmitting data and receiving scheduling information from a central office node 107. While a TDMA PON is one representative example, one skilled in the art will recognize that the principles of the present invention may be applied to any network with one or more transmitter nodes that requires accurate timing information for use in scheduling or for other purposes. Referring to FIG. 1B, transmitter nodes 110–113 are connected by optical fiber link 102 to central office node 107 through illustrative optical power splitter 106. It will be apparent to one skilled in the art that other suitable communications mediums, such as electrical wires, are equally advantageous.

The equipment in the central office 107 is comprised of, in part, a scheduler and timing circuitry 119 for scheduling transmission from the transmitters 110–113, an optical receiver 103 having a burst mode clock data recovery circuit for receiving incoming optical signals and recovering the transmitted clock and data, and an optical transmitter 120 for transmitting optical signals to the transmitters 110–113 and other network nodes via transmission lines 114 and 108, respectively. The timing circuitry within circuitry 119 passes timing data to the scheduler within circuitry 119 that, in turn, assigns timeslots to the transmitters 110–113 and transmits timeslot information to the transmitters 110–113. The transmitters 110–113 use that timeslot information to transmit user data such that the different blocks of user data are separated in time by, for example, guard band 109 to avoid interference when they reach the optical receiver 103 at the central office 107. This ensures, for example, that the end of the transmission A 115 from transmitter 110 does not interfere with the beginning of the transmission B 116 from transmitter 111, transmission C 117 from transmitter 112 or transmission D 118 from transmitter 113. Maximum efficiency is achieved when the guard band is as narrow as possible. It follows that, when the timing is more accurately known, the guard band can be decreased.

Figure 2:
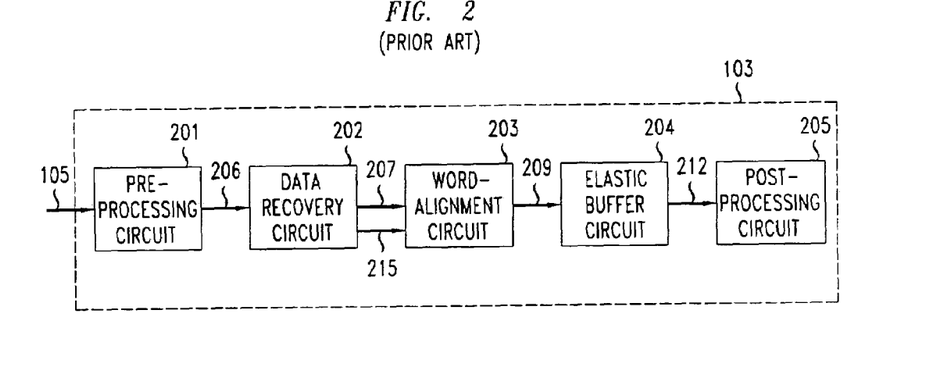
FIG. 2 shows the illustrative components of the receiver of the network of FIG. 1B.

FIG. 2 shows an expanded view of the receiver 103 in central office 107 of FIG. 1 and the functional circuits contained therein. This circuitry is, in part, comprised of a preprocessing circuit 201, a clock and data recovery circuit 202, a word alignment circuit 203, an elastic buffer circuit 204 and a post-processing circuit 205. Blocks 203, 204 and 205, although not typically part of the clock and data recovery circuit, are shown in FIG. 2 as an illustration of a typical receiver. The preprocessing circuit 201 accepts the input data stream 105 from the transmission medium and produces data signal 206. The data signal 206 is input into the clock and data recovery circuit 202 that produces the recovered transmitted clock signal 215 and the recovered data signal 207. An illustrative example of the clock and data recovery circuit 202 is described in U.S. Pat. No. 5,757,872, which is incorporated by reference in its entirety as previously set forth hereinabove. As discussed above, and as is well known in the art, the clock and data recovery circuit 202 recovers the transmitter clock with a bounded phase relationship with respect to the incoming data signal. Thus, the recovered transmitter clock and the incoming data signal will have the same frequency and their relative phase will remain within a given range.

Figure 3:
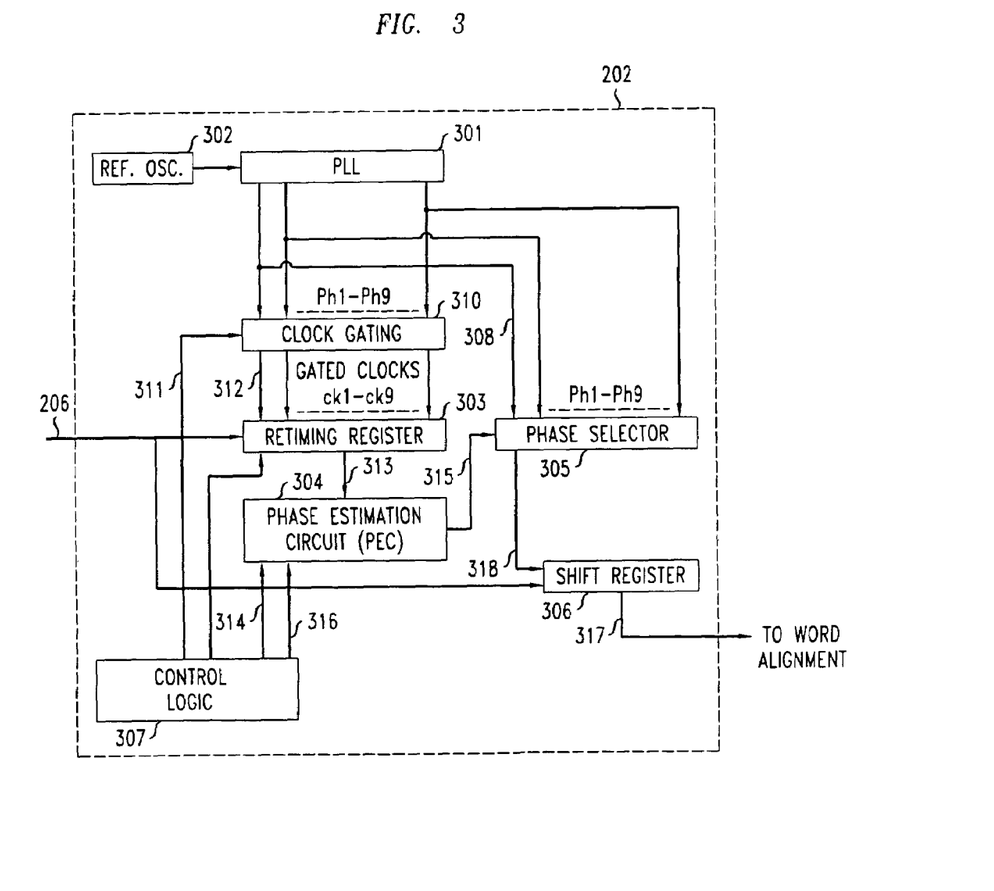
FIG. 3 shows the illustrative components of the data recovery unit of FIG. 2.

FIG. 3 shows an illustrative embodiment of a clock and data recovery circuit of the present invention. Signal 206, output by the pre-processing circuit 201 in FIG. 2, represents the input to the clock and data recovery circuit 202 in FIG. 3. The clock and data recovery circuit 202 is illustratively comprised of reference oscillator 302 and a phase-locked loop (PLL) 301 that are used together to provide a number N of clock signals 308 at the oscillating frequency generated by reference oscillator 302. Each signal 308 is shifted in phase by 1/N of the clock cycle with respect to the preceding signal. In the illustrative embodiment of FIG. 3 and subsequent figures, there are nine such phase-shifted signals, designated as individual clock signals ph1–ph9. It will be obvious to one skilled in the art that any other number of phase-shifted signals is possible and that the frequency of the individual clock signals ph1–ph9 is a multiple of the oscillating frequency of the reference oscillator 302. One skilled in the art will also recognize that comparable alternatives such as, illustratively, a delay line or a delay-locked loop, may be used in place of PLL 301.

Phase information from the generated clock signals is stored in phase selector 305. Additionally, clock-gating circuit 310 uses the clock signals to form a series of gated clock signals 312 that are input into the retiming register 303. Retiming register 303 receives input data signal 206 and, using the gated clock signals 312 from circuit 310, generates a digital representation of at least one complete period of the input data signal 206. Phase estimation circuit (PEC) 304 receives this digital representation via signal 313 and uses that representation to generate an estimate of the phase of the input data signal 206, as received. This estimate is input into phase selector 305 via signal 315. The phase selector 305 then compares the phase of the input data signal 206 to the phase information from the clock signals generated by the PLL 301. A desired clock signal (e.g., the clock signal having a sampling edge closest to the middle of the bit-interval of input data signal 206) is then selected for future sampling of the input data signal 206 to recover the data in that signal. This selected clock signal is then transmitted via signal 318 and is used by shift register 306 to sample input data signal 206. The sample data signal 317 is then forwarded to the word alignment circuitry 203 in FIG. 2 for word alignment and further processing. Further detail of the clock gating circuit 310, the retiming register 303, the PEC 304, the phase selector 305 and shift register 306 is provided below.

Figure 4:
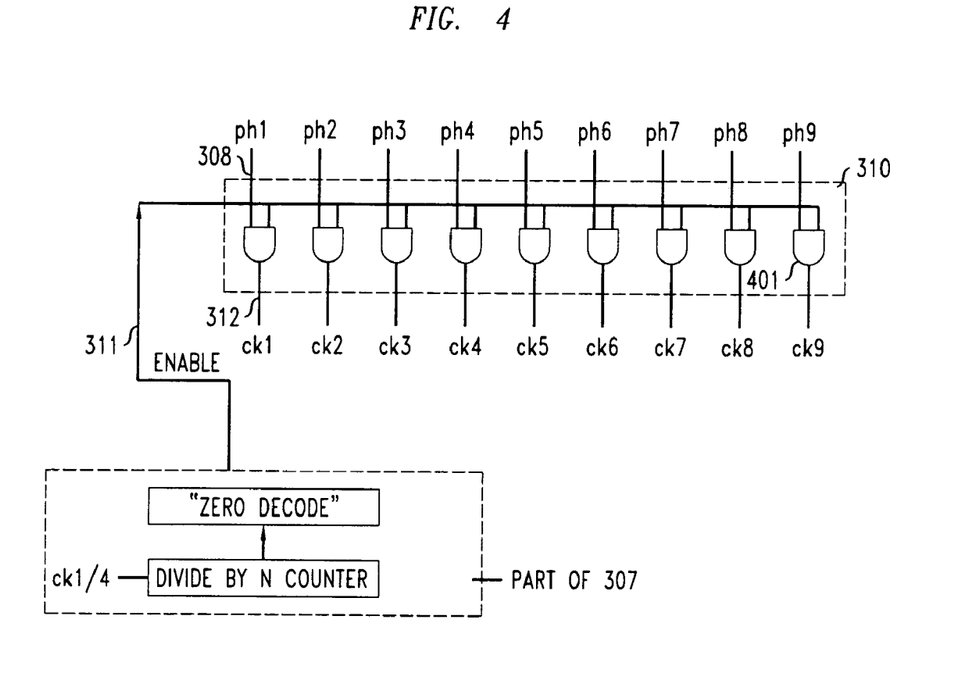
FIG. 4 shows an illustrative clock-gating unit within the data recovery unit of FIG. 3.

FIG. 4 shows a detailed representation of the illustrative structure of the clock gating circuit 310. In FIG. 4 circuit 310 is comprised of nine 2-input AND gates, such as gate 401, that function to gate the input clock signals ph1–ph9 with the enable signal 311. Sampling by the clock gating circuit 310 takes place only while the enable signal 311 is active. When signal 311 is active, it causes clock signals ph1–ph9 to propagate through the clock gating circuit 310, thus forming gated clock signals ck1–ck9. When signal 311 is inactive, the waveforms of all gated clocks ck1–ck9 are steady at the logic level "0".

Figure 5:
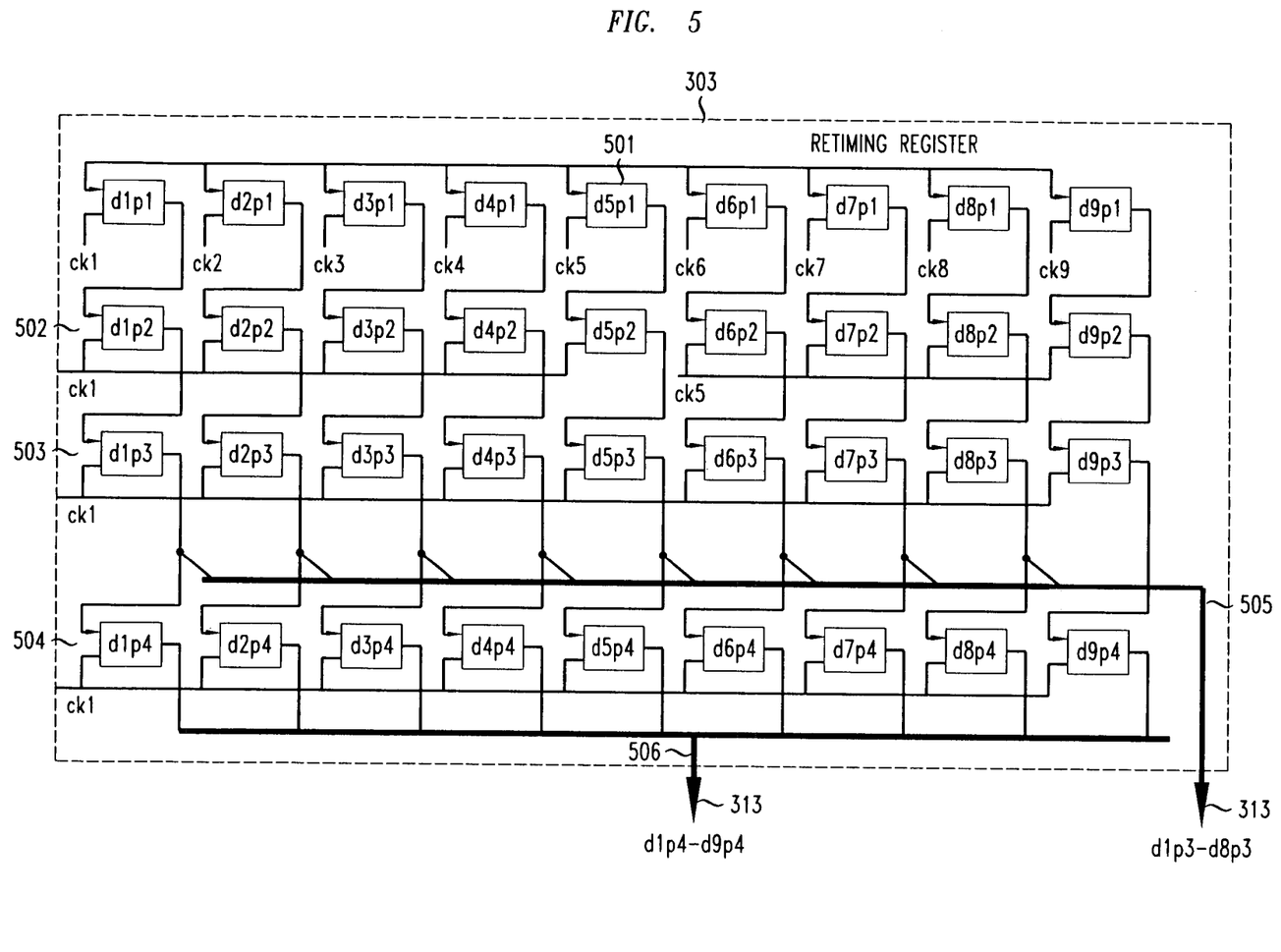
FIG. 5 shows an illustrative retiming register unit within the data recovery unit of FIG. 3.

FIG. 5 shows the internal structure of retiming register 303. Referring to that figure, the first pipeline stage 501 of register 303 has nine flip-flops (d1p1–d9p1), the population of each being clocked by a different one of the clocks ck1–ck9. The second pipeline stage 502 of register 303 also has nine flip-flops d1p2–d9p2, the inputs of which are the outputs of the flip-flops d1p1–d9p1. In that second pipeline, the population of flip-flops d1p2–d5p2 is clocked by signal ck1 and the population of flip-flops d6p2–d9p2 is clocked by signal clock ck5. The third pipeline stage of register 303 consists of nine flip-flops d1p3–d9p3, the inputs of which are the outputs of the flip-flops d1p2–d9p2. Each of the flip-flops d1p3–d9p3 in the third pipeline state is collectively clocked by signal clock ck1.

Thus, as is well known in the art, such an arrangement of flip-flops causes the initial samples taken in the first pipeline stage to be retimed such that all flip-flops in the third pipeline stage are clocked by the same clock signal ck1. One skilled in the art will recognize that this particular retiming scheme is merely illustrative and that other, similar ways of retiming are equally beneficial. The fourth pipeline stage of the retiming register 303 consists of nine flip-flops d1p4–d9p4, all clocked by signal ck1 and replicating the states of flip-flops d1p3–d9p3, except that the samples in this fourth pipeline state have a delay of one clock cycle while the enable signal 311 is active. The output of the retiming register 303 is, therefore, a set 313 of signals 505 and 506 consisting of the ouputs of the individual flip-flops d1p3–d8p3 and d1p4–d9p4, respectively. These signals are a digital representation of the waveform of the input signal 206. Signals 313 are used as an input to the phase estimation circuit (PEC) 304, along with control signals 314 and 316 driven by the control logic circuit 307.

Figure 6:
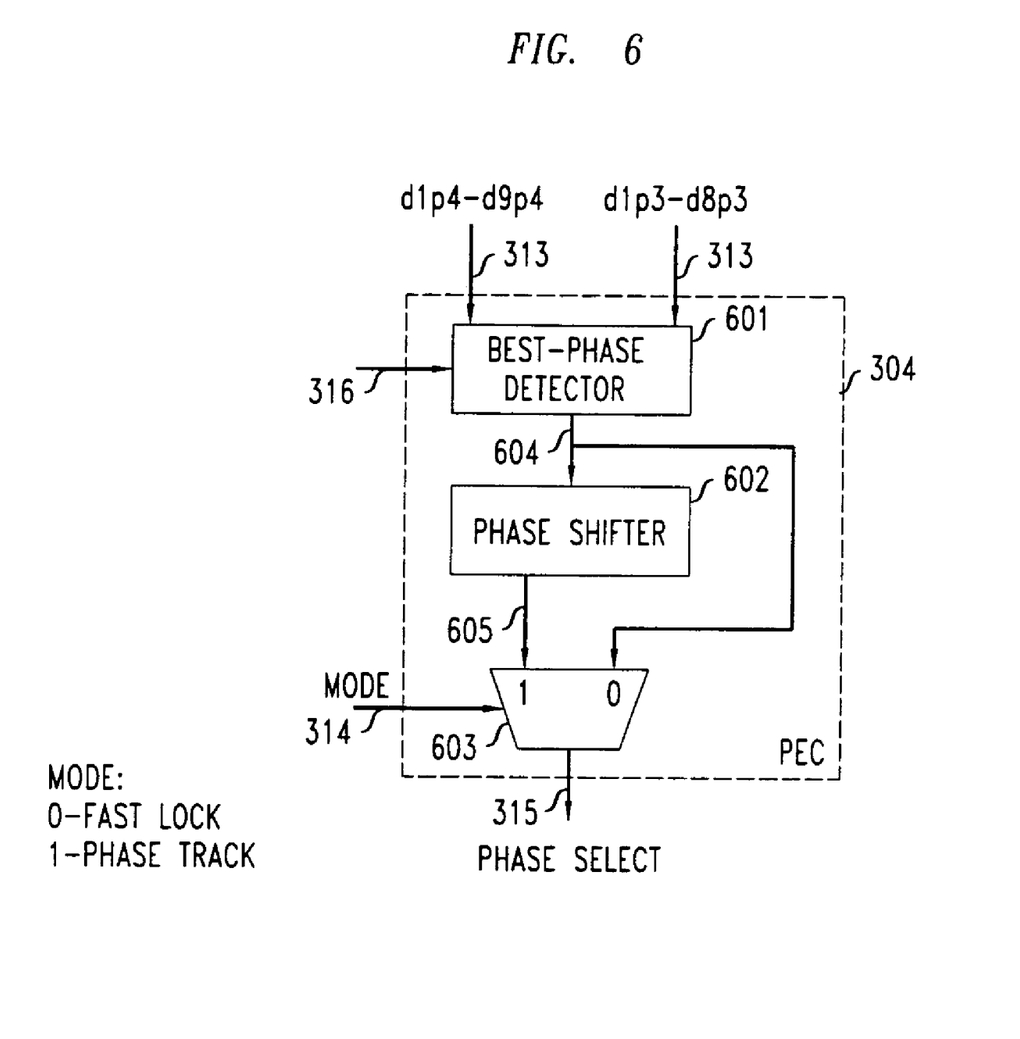
FIG. 6 shows an illustrative phase estimation circuit within the data recovery unit of FIG. 3.

FIG. 6 shows the structure of an illustrative PEC 304, which is comprised of a best-phase detector 601, phase shifter 602 and a 2-to-1 multiplexer 603. In operation, the PEC 304 performs an estimation of the phase of input signal 206 in FIG. 3. As previously discussed, the digital representation of the waveform of signal 206 is input into PEC 304 as signal set 313. Additionally, control signals 314 and 316, discussed below, are also input into PEC 304 to, among other purposes, control the mode of operation of the PEC.

Figure 7:
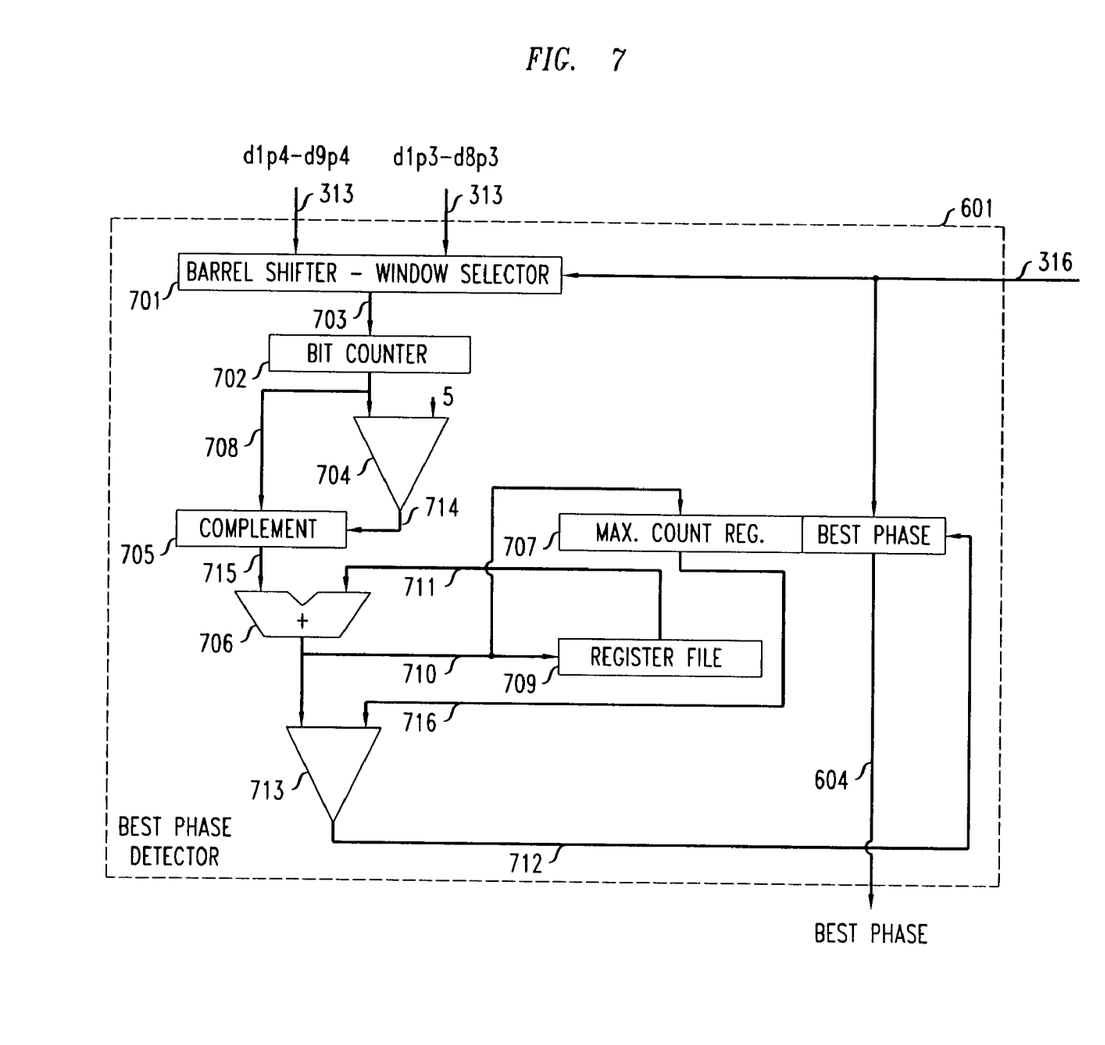
FIG. 7 shows an illustrative best-phase detector circuit of the phase estimation circuit of FIG. 6.

The PEC circuit can operate in two different modes, fast-locking mode or phase-tracking mode, depending on the status of the mode signal 314. In fast-locking mode, the output 604 of the best-phase detector 601 is selected as the output for circuit 304. FIG. 7 shows an illustrative structure of the best-phase detector circuit 601 of FIG. 6. Circuit 601 is comprised of a barrel shifter 701, bit counter 702, comparator 704, conditional complement circuit 705, a fixed-point adder circuit 706, a comparator 713, a maximum-count/best-phase register 707 and a register file 709. Inputs to the circuit 601 are the retimed data sample signals 313, discussed above, and a phase-set control signal 316, driven by the control logic 307.

In operations, signal 316 determines a set of 9 consecutive signals from the 17 flip-flop bits of signal 313 that will appear at the output 703 of the barrel shifter circuit 701. These 9 consecutive signals represent an estimate of the 9 bits forming a single complete period of the waveform of input signal 206. For example, if signal 316 assumes the value of 1, the value of signal 703 will be, illustratively, d1p4, d2p4, d3p4, d4p4, d5p4, d6p4, d7p4, d8p4, d9p4 (i.e., the beginning of a waveform will be captured by the flip-flop value in flip-flop d1p4). Further if, for example, signal 316 assumes the value of 5, the value of signal 703 will be, illustratively, d5p4, d6p4, d7p4, d8p4, d9p4, d1p3, d2p3, d3p3, d4p3 (i.e., the beginning of a waveform will be captured by the flip-flop value in flip-flop d5p4). The value of signal 316, therefore, indicates the illustrative beginning of a period of the waveform of signal 206.

The bit counter circuit 702, illustratively a parallel counter, outputs the binary-encoded number of logic "ones" among the bits of signal 703. Circuit 704 is a digital comparator, well known to one skilled in the art, which is designed to indicate, illustratively, whether or not the number represented by output 708 of the bit counter 702 is less than five. This indication is performed such that, for example, the comparator output signal 714 is set to "1" if the number represented by 708 is between 0 and 4, and 714 is set to "0" if the number represented by 708 is between 5 and 9. If signal 714 is set to "1", the output 715 of circuit 705 will represent the binary number obtained by subtracting the value of 708 from 9. If signal 714 is set to "0", the output 715 of circuit 705 will represent the same binary number as signal 708. In this way, the number of binary "ones" (or "zeros") can be estimated.

In addition to acting as input to barrel shifter 701, signal 316 is used to select a corresponding accumulated metric stored in register file 709 for selecting the best clock phase. The value of the accumulated metric is presented to the input of the fixed-point adder 706, through signal 711. The possible circuit implementations of adder 706 are well known to those skilled in the art. The adder 706 is used to calculate the new value of the metric corresponding with the clock phase selected by signal 316. The output 710 of the adder 706 is connected to the input of the register file 709 such that, upon the completion of the addition performed by circuit 706, the new value of the accumulated metric is written in the register file 709, replacing the value read from 709 prior to the addition. Signal 710 is connected to an input of the digital comparator 713. The second input 716 of the said comparator represents the value of the maximum accumulated metric per clock phase, stored in register 707. Comparator 713 is, once again, a digital comparator. If the output of comparator 713 indicates that the binary value represented by signal 710 is greater than the binary value represented by signal 716, the value of signal 710 is written to the register 707, along with the phase value represented by signal 316.

The above-described operation of the best-phase detector 601 is performed for all possible clock phase values, representing here illustrative clocks ck1 to ck9. Upon the completion of the repeated operation, register 707 contains the binary number corresponding to the "best" sampling clock phase, i.e., that clock phase having a rising (or falling) edge that is most likely closer in time to the middle of the bit interval of the transmitted data signal 206 than the rising (or falling) edge of any other clock phase. Referring once again to FIG. 3, if the PEC 304 is operating in fast-locking mode, output signal 315 of the PEC corresponds to the best-phase signal 604 in FIG. 7. Phase selector 305 then selects the phase ph1–ph9 most closely matching that phase indicated in signal 315 and selects the corresponding clock ck1–ck9 as the sampling clock to sample input signal 206. Upon the completion of the repeated operation, the contents of the register file 709 are reset to 0.

Referring once again to FIG. 6, when PEC 304 is in fast-locking mode, the output from detector 601 is used as the best phase to sample the input signal 206. The phase shifter 602 is bypassed and, accordingly, a quick lockonto the phase of the input signal 206 is obtained. However, temporary distortions in the waveform of the input signal 206 may result in noise in the communication medium 102. This noise may be misinterpreted as a large shift in phase during the above quick lock procedure and, accordingly, a sampling clock with an inaccurate phase may be chosen to sample input signal 206. Thus, using the detected phase directly from detector 601 may result in an erroneous sampling of input signal 206.

In order to prevent the possibility of an erroneous sampling of input signal 206 in FIG. 3, a phase-tracking mode may be used instead of a fast-locking mode. When phase-tracking mode is utilized, PEC circuit 304 iteratively compares, using phase shifter 602, the estimate of the best-phase signal 604 that is generated by detector 601 with the currently-selected estimated phase of that signal that is at that time currently being used to sample input signal 206. Phase shifter 602 then functions to slowly adjust the currently-selected estimated phase in a known way until the estimated phase matches the best-phase as detected by detector 601. If the phase of signal 604 does not match the currently-selected estimated phase, circuit 602 changes the currently selected estimated phase by a minimum phase step. Alternatively, if signal 604 matches the currently selected estimated phase, circuit 602 maintains the current phase selection. After this match is achieved, the output of the phase shifter 602 is selected to be the output of circuit 304.

Figure 8:
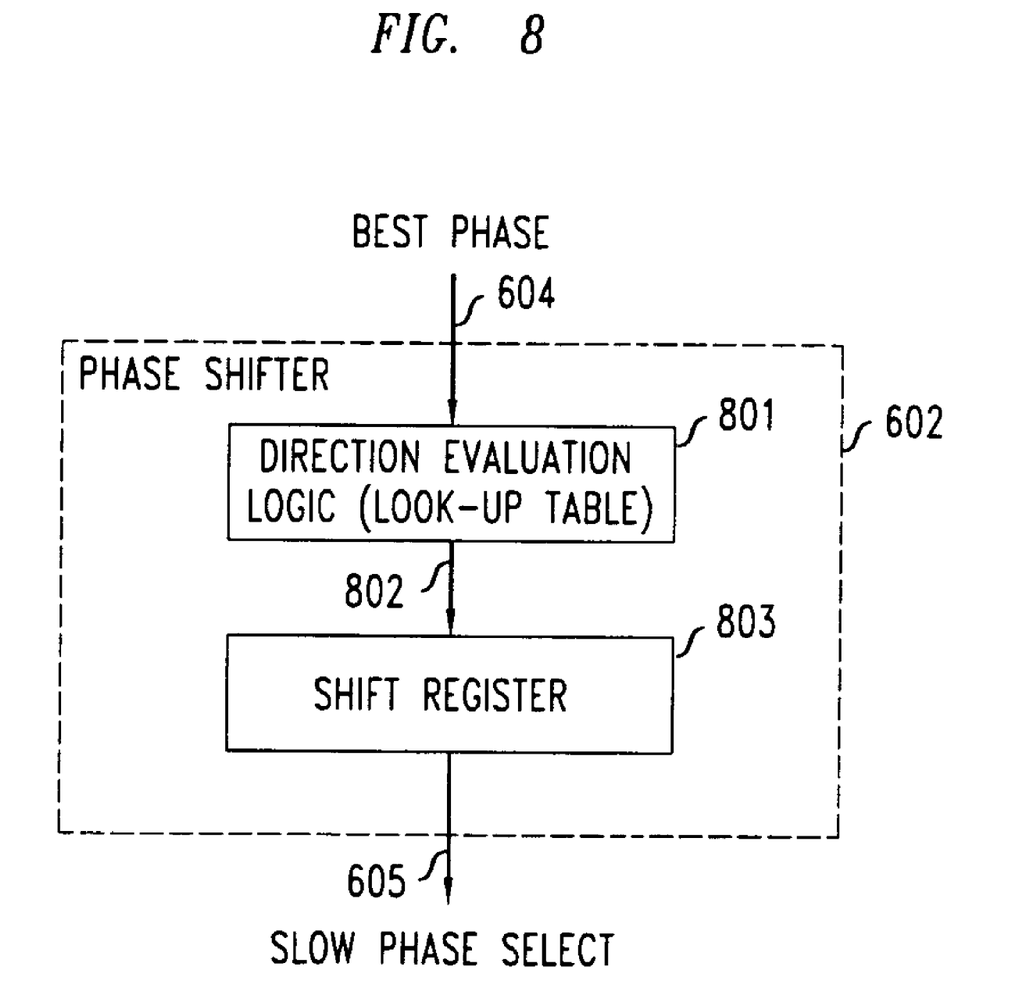
FIG. 8 shows an illustrative phase shifter circuit of the phase estimation circuit of FIG. 6.

FIG. 8 shows the structure of the above-described phase shifter circuit 602. Specifically, phase shifter 602 is illustratively comprised of a direction evaluation logic 801 and a shift register 803. The input to 602 is the best phase signal 604, driven by the best phase estimator 601. The direction evaluation logic 801 determines whether to positively increment or negatively increment the phase of the best phase signal 604. The decision to use a positive or negative increment is made, illustratively, by reference to a look-up table that gives a desired increment direction depending upon various conditions such as, for example, the number of logical "ones" determined by bit counter 702 in FIG. 7. The output 802 of circuit 801, representing the positive or negative increment direction, feeds into a shift register which, in response, changes the sampling clock phase by a single phase step in the indicated direction and stores the new clock phase for the duration of the following phase estimation cycle.

Referring once again to FIG. 3, if the PEC 304 is operating in phase-tracking mode, output signal 315 of the PEC corresponds to the slow phase select signal 605 in FIG. 6. Phase selector 305 then selects the phase ph1–ph9 most closely matching that phase indicated in signal 315 and selects the corresponding clock ck1–ck9 as the sampling clock to sample input signal 206. Signal 318 thus represents the selected sampling clock that is used to clock the input data signal 206 into the shift register 306. The parallel (multi-bit) output 317 of the shift register 306 represents the output of the data recovery circuit 202 and feeds into the word alignment circuit 203 of FIG. 2.

The advantages of the above described method and apparatus for clock and data recovery are numerous. For example, the locking onto the phase of the incoming data signal is nearly instantaneous since the circuitry of the above embodiment of the present invention can be entirely digital. Additionally, since the circuitry of the present invention can be implemented entirely in the digital domain, it is very reliable and cost effective. Furthermore, since the received clock and the transmitted clock generally vary slowly with respect to one another, the above-described clock locking and tracking circuitry can be used infrequently, which is beneficial as it results in low power dissipation.

The foregoing merely illustrates the principles of the invention. It will thus be appreciated that those skilled in the art will be able to devise various arrangements which, although not explicitly described or shown herein, embody the principles of the invention and are within its spirit and scope. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A method for clock and data recovery comprising:
   generating a plurality of input clock signals in said plurality having a different phase;
   determining the phase of an input signal data stream;
   selecting at least one of said plurality of input clock signals, said selection based on said phase of an input signal data stream, to sample said input signal data stream, wherein the step of determining the phase of an input signal data stream comprises:
   generating a plurality of gated clock signals from said plurality of input clock signals;
   retiming samples from said input data stream in a way such that a digital representation of at least one period of said input data signal is generated; and
   detecting the position of a desired bit in said at least one period of said input data signal.

2. The method of claim 1 wherein the step of selecting at least one of said plurality of input clock signals comprises:
   comparing each clock signal in said plurality of input clock signals to the phase of said input signal data stream; and
   determining which of said plurality of input clock signals has a rising or falling edge that is closer in time to the middle of a bit interval of said input data signal than a rising or falling edge of any other clock signal in said plurality.

3. Apparatus for clock and data recovery comprising:
means for generating a plurality of input clock signals, each of said input clock signals in said plurality having a different phase;
means for determining the phase of an input signal data stream;
means for selecting at least one of said plurality of input clock signals, based on said phase of an input signal data stream, to sample said input signal data stream, wherein said means for determining the phase of an input signal data stream comprises:
means for generating a plurality of gated clock signals from said plurality of input clock signals;
means for retiming samples from said input data stream in a way such that a digital representation of at least one period of said input data signal is generated; and
means for detecting the position of a desired bit in said at least one period of said input data signal.

4. The apparatus of claim 3 wherein said means for selecting at least one of said plurality of input clock signals comprises:
means for comparing each clock signal in said plurality of input clock signals to the phase of said input signal data stream; and
means for determining which of said plurality of input clock signals has a rising or falling edge that is closer in time to the middle of a bit interval of said input data signal than a rising or falling edge of any other clock signal in said plurality.

* * * * *